(12) United States Patent
Weiss (10) Patent No.: US 11,390,107 B2
(45) Date of Patent: Jul. 19, 2022

(54) OBJECT MARKING FOR OPTICAL AUTHENTICATION AND METHOD FOR PRODUCING SAME

(71) Applicant: AUTHENTIC VISION GMBH, Wals (AT)

(72) Inventor: Thomas Weiss, Salzburg (AT)

(73) Assignee: AUTHENTIC VISION GMBH, Salzburg (AT)

( * ) Notice: Subject to any disclaimer, the term of this patent is extended or adjusted under 35 U.S.C. 154(b) by 0 days.

(21) Appl. No.: 17/062,782

(22) Filed: Oct. 5, 2020

(65) Prior Publication Data

US 2021/0070092 A1 Mar. 11, 2021

Related U.S. Application Data

(62) Division of application No. 15/039,950, filed as application No. PCT/EP2014/075916 on Nov. 28, 2014, now abandoned.

(30) Foreign Application Priority Data

Nov. 28, 2013 (EP) .................................. 13194863

(51) Int. Cl.
*B42D 25/355* (2014.01)
*B42D 25/328* (2014.01)
(Continued)

(52) U.S. Cl.
CPC .......... *B42D 25/328* (2014.10); *B42D 25/29* (2014.10); *B42D 25/355* (2014.10); *B42D 25/425* (2014.10); *G03H 1/0011* (2013.01)

(58) Field of Classification Search
CPC .......................... B42D 25/355; B42D 2035/50
See application file for complete search history.

(56) References Cited

U.S. PATENT DOCUMENTS 7,188,774 B2 * 3/2007 Pinchen ................. B42D 25/40
235/487
8,090,952 B2 * 1/2012 Harris ..................... H04L 9/001
713/176
(Continued)

FOREIGN PATENT DOCUMENTS

CN 1111021 11/1995
EP 0644508 3/1995
(Continued)

OTHER PUBLICATIONS

International Search Report and Written Opinion issued in PCT/EP2014/075916, dated Feb. 11, 2015.
(Continued)

*Primary Examiner* — Kyle R Grabowski
(74) *Attorney, Agent, or Firm* — Norton Rose Fulbright US LLP (57) ABSTRACT

Object marking, and method for producing same, for optical authentication of an object, wherein at least one section of a material piece of a basic material is determined arbitrarily or randomly and the object marking is produced with the at least one section, and wherein the basic material of the material piece has a repeating security feature having optical properties dependent on the viewing angle, the dimensions of said security feature being larger than the dimensions of the section, more particularly larger than the dimensions of the object marking, such that each section is unique and has only a part of the security feature.

20 Claims, 3 Drawing Sheets

(51) Int. Cl.
*B42D 25/29* (2014.01)
*B42D 25/425* (2014.01)
*G03H 1/00* (2006.01)

(56) References Cited

U.S. PATENT DOCUMENTS

| | | | |
|---|---|---|---|
| 9,723,171 B2 * | 8/2017 | Liddicott | H04N 1/32325 |
| 2002/0080221 A1 | 6/2002 | Aroneo | |
| 2006/0097512 A1 | 5/2006 | Isherwood | |
| 2009/0074231 A1 | 3/2009 | Rancien | |
| 2009/0160177 A1 * | 6/2009 | Dietrich | B31D 1/026 283/70 |
| 2012/0139229 A1 * | 6/2012 | Matsubara | G09F 3/10 283/70 |
| 2014/0112962 A1 | 4/2014 | Kim et al. | |

FOREIGN PATENT DOCUMENTS

| | | | | |
|---|---|---|---|---|
| EP | 1132862 | | 9/2001 | |
| EP | 2075114 | | 7/2009 | |
| EP | 2293261 | | 3/2011 | |
| EP | 2461307 | | 6/2012 | |
| FR | 2977051 | | 12/2012 | |
| GB | 2129739 | | 5/1984 | |
| JP | 20003121625 | A | 4/2003 | |
| WO | WO 1993012506 | | 6/1993 | |
| WO | WO 1999017486 | | 4/1999 | |
| WO | WO 2002050790 | | 6/2002 | |
| WO | WO 2004/070667 | | 8/2004 | |
| WO | WO 2008011108 | | 1/2008 | |
| WO | WO 2010/001203 | | 1/2010 | |
| WO | WO-2010001203 A1 * | | 1/2010 | B42D 25/29 |
| WO | WO 2012131239 | | 10/2012 | |
| WO | WO-2012156097 A1 * | | 11/2012 | B42D 25/29 |
| WO | WO 2012177845 | | 12/2012 | |
| WO | WO 2013/188897 | | 12/2013 | |
| WO | WO 2014184188 | | 11/2014 | |

OTHER PUBLICATIONS

Opposition issued in corresponding European Application No. 14805269.9, dated Jul. 19, 2019 (Machine Translation provided).
Examination Report from Indian Patent Office issued in corresponding Application No. 201637018419 dated Jun. 7, 2020 (English Translation provided).

* cited by examiner

OBJECT MARKING FOR OPTICAL AUTHENTICATION AND METHOD FOR PRODUCING SAME

CROSS-REFERENCE TO RELATED APPLICATIONS

This application is a divisional application of U.S. patent application Ser. No. 15/039,950 filed 27 May 2016, which is a national phase application under 35 U.S.C. § 371 of International Application No. PCT/EP2014/075916 filed 28 Nov. 2014, which claims priority to European Patent Application No. 13194863.0 filed 28 Nov. 2013. The entire contents of each of the above-referenced disclosures is specifically incorporated by reference herein without disclaimer.

BACKGROUND OF THE INVENTION

The invention relates to a method for producing an object marking, and to the object marking itself, for optical authentication of an object, wherein at least one section of a material piece of a basic material is determined variably and arbitrarily and/or randomly and the object marking is produced with the at least one section.

Product counterfeiting has become increasingly problematic. Systems enabling the authentication of an object, especially of a product, provide remedy in this respect. These systems assign, as a rule, a unique serial number to each object and store it along with object properties, similar to a finger print with people. Accordingly, authentication means in this context the examination of authenticity of a product, or more general, of any object, in particular with respect to the question of whether the product constitutes product counterfeiting or not. In this process, particular differentiating features of the object are generally identified and examined in that they are compared to the, e.g. stored, features of a true object. If the objects to be authenticated lack the appropriate differentiating features, these may be added artificially. The main purpose of object marking as defined by the invention is accordingly the adding of additional differentiating features to the object, which may be taken into account during authentication and increase reliability.

In order to protect an object property from being copied, known solutions make use of microscopic properties such as surface structures or discoloration of fibers (reference). This is getting to a point where objects are marked with a specific DNA. A drawback of these solutions is that these properties are only readable with specific equipment, at any rate, however, not with commercially available cameras. The reason for the counterfeit protection achieved by the use of such physical properties lies in the stochastic nature of the properties mentioned, i.e. they are practically not reproducible.

Such object marking is already known from U.S. Pat. No. 8,090,952 B2 which describes a unique product marking verifiable by means of a smart phone. The product marking and/or a segment of the product marking is formed by an arbitrarily chosen section of a repeating pattern. A label may be arranged at an arbitrarily chosen position in the segment as an additional security feature, wherein the label may also comprise a hologram. Since both the repeating pattern as such and the content of the label are defined, such product marking may be reproduced with relatively little effort already. Since the label, apart from the arrangement, does not comprise any random elements and thus has to be analyzed once only, a simple photocopy of the arrangement suffices to be able to duplicate the section of the pattern and the position of the label.

Furthermore, WO 2004/070667 A2 describes the production of a security indicator on the basis of a random pattern which is in turn produced on the basis of a random physical process. Although a much larger number of random and hence unique differentiating features may be embedded in the product marking in this manner, these are also completely detectable by means of a simple photocopy and thus duplicatable—although with increased effort.

US 2002/0080221 A1 describes a digital hot embossing system suitable for the application of security features, such as holograms, in freely selectable shapes. Although the shapes may allegedly be chosen "randomly", there is not disclosed how this "random" is achieved, and it must be assumed that this is a digital and hence deterministic "random" which is accordingly digitally replicable. Due to the structure of the pre-printed pattern used, it is possible to completely analyze and consequently also reproduce the security feature already on the basis of one single original. Moreover, the arrangement and orientation of the security feature is defined by the pre-printed pattern and is hence predictable.

EP 2 461 307 A2 illustrates a method for producing markings for the identification and for the proof of authenticity of products. The individual markings are punched out of a sheet of holographically exposed material by means of a cutting tool.

EP 2 075 114 A2 describes a method in which labels on which, for instance, holograms are arranged as primary identification features are produced in individual shapes by cutting or punching from a label web. The concrete individual shape is predetermined by a computer-controlled system and is hence reproducible.

Finally, WO 2010/001203 A1 discloses a method for producing markings for protection from counterfeiting which are verifiable by means of a camera phone. A web provided with a periodic pattern is cut into a plurality of identical sections, i.e. the dimensions of the sections correspond exactly to the period of the pattern.

SUMMARY OF THE INVENTION

It is an object of the invention to provide an object marking and/or a method for producing the same, which may be examined by a commercially available programmable device with incorporated camera (e.g. a smart phone), on the one hand, and which can at the same time be replicated or counterfeited neither by a two-dimensional color copy with sufficiently high resolution nor with the aid of identical production resources.

The invention solves this object in that, in a method of the kind stated in the outset, the basic material of the material piece comprises a repeating security feature (i.e. a periodic sequence of security features) having optical properties dependent on the viewing angle, the dimensions of said security feature (which correspond to one period of the sequence of security features) being larger than the dimensions of the section, more particularly larger than the dimensions of the object marking, such that each section is unique and comprises only a part of the security feature. The section may in particular also have smaller dimensions than the material piece, such that the removal of a section need not stringently result in a cut through of the material piece. The section may, for instance, be produced by separation, e.g. by means of cutting or punching, or else by detachment, for instance, by means of an embossing method. Essential for the security of the invention is—along with the relationship of the dimensions—the arbitrary and/or random determining of the section, i.e. the section is determined in the scope of a random process. "Random" means in this context the dependence on a true random as it occurs, for instance, in stochastic physical processes. In contrast to pseudo random which is usually provided by specific deterministic algorithms with the aid of a computer, such "true" random is not reproducible and not predictable. Security features means in this connection those features of a material and/or of the basic material which have optical properties dependent on the viewing angle, such that it is not possible to reproduce all available optical properties on the basis of a two-dimensional copy. Typical security features are, for instance, water marks, a specific paper quality, specific three-dimensional printing techniques, safety threads, printing elements with tilting effect, optically variable colors, or generally optically variable features, e.g. in the form of kinegrams, holograms, or patterns, signs and shapes which are recognizable under a certain viewing angle only and/or change their color, as well as combinations of the techniques mentioned. It is to be understood that the basic material may also comprise a plurality of equal or similar security features as well as any combination of equal and different security features. Such security features may, in the case of complete knowledge, be replicated at least up to such an extent that the replicate stands up to an examination by means of a—comparatively coarsely resolving—camera. The object marking in accordance with the invention, however, aggravates replication additionally in that the individual object marking only discloses a small part of the security features of the basic material. Since this part is selected randomly, the number of object markings to be analyzed for a replication of the basic material cannot be predicted: In some circumstances, even if all produced object markings are available, not all security features of the basic material are disclosed, and an imitation of the production method is therefore not possible. On the basis of an individual object marking it is not even possible to derive the periodicity of the security feature and/or the sequence of security features. On the other hand, from a joint view of a plurality of object markings it cannot be reconstructed with certainty whether the respective sections have been taken from the same basic material, i.e. there is no reliable method for reconstructing the basic material. The instant invention thus achieves protection from copies which could otherwise be produced with the aid of identical production resources, by the use of a random production process. Thus, even with the knowledge and the production resources of the creator and/or the original producer, a specific production of two objects with identical properties is not possible.

Accordingly, the above-mentioned object is solved in accordance with the invention by an object marking of the kind stated in the outset, in which the basic material of the material piece has a repeating security feature having optical properties dependent on the viewing angle, the dimensions of said security feature being larger than the dimensions of the section, more particularly larger than the dimensions of the object marking, such that each section is unique and comprises only a part of the security feature. The following improvements and/or the advantages associated therewith apply to this effect both to the method for producing an object marking and to the object marking itself, as well as to a set of object markings.

The advantageous properties of the object marking in accordance with the invention are recognizable and verifiable especially by means of a set with a plurality of object markings, wherein the section and/or the sections of every single object marking of the set differs/differ from the sections of all the remaining object markings of the set. This is in particular even then true if all sections have been taken from the same basic material. In this case the periodicity of the sequence of security features of the basic material may be recognized basically by means of a sufficiently large number (dependent on the dimension of the section in relation to the period), which does not mean, however, that the basic material could be reconstructed completely by means of the same number. Moreover, it is of advantage if every section is statistically independent of every other section. Contrary to this, a significant statistic dependence and/or correlation would indicate deterministically defined sections which could thus be predicted and in the last consequence be counterfeited.

Due to the high effort of a replication as compared to the production costs it is particularly advantageous if the security feature of the basic material is an optically variable feature, i.e. a material having properties dependent on the viewing angle, in particular a hologram.

It is further favorable if the security material and/or its optical properties have dimensions which correspond at least to the resolving power of the human eye, in particular the resolving power of commercially available cameras, such that the security feature is readable and verifiable with a commercially available camera. In the case of dimensions which correspond at least to the resolving power of the human eye, the security feature may also be examined by direct comparison e.g. with a plurality of simplifying images. Depending on the camera technique used, a minimum dimension of 100 μm may, for instance, be provided. As a matter of principle, the security feature is to be readable and verifiable with a commercially available camera without subsequent enhancement and/or modification of the optics, such that this feature may be incorporated in an automatic examination. In particular, in this case the verifiable features and/or properties cannot only be used for verification, but also for identification of the object marking, i.e. the identity of the object marking may be determined on the basis of the security features taken and/or the optical properties thereof (which, as stated above, illustrate a randomly determined part of the security features of the basic material). It is not necessary that always the entire section is detectable and/or readable at once, but authentication on the basis of one or a plurality of partial regions of the object marking, which generally does not comprise all sections completely, may be allowed.

A non-deterministic and at the same time easy-to-generate contribution to the random selection of the section may be achieved in that the material piece is designed in the form of a band and a position of the band is selected by a random and/or non-controlled advance of the band which preferably deviates from the period of the security feature of the basic material, and the section is determined in relation to the selected position.

It is of further advantage for the selection of the security features if the section is determined by a variable, random selection mask, wherein the section is determined either in correspondence with a region of the material piece masked by the selection mask or in correspondence with a region of the material piece unmasked and/or spared by the selection mask. The selection mask makes it possible to determine the portion of the security features of the basic material disclosed by an individual object marking in an even more flexible manner, and to reduce the size of said portion.

The variable selection mask may preferably be applied on the material piece in the form of a partial cover, in particular in the form of a layer applied in places and/or in regions. Such a cover may selectively cover and hence mask a part of the security features comprised in the section. Moreover, the cover may be applied by physically random and/or chaotic processes, such that the selection mask contributes to randomness, i.e. to non-determinism, of the selection of security features used for authentication. It is irrelevant whether the cover exceeds the section or is applied within the limits of the section only.

The diversity of the variations of object markings achievable with the method may be further increased if at least one arbitrarily and/or randomly determined part of the material piece is removed prior to the production of the object marking, preferably even prior to the determining of the section. The part removed can accordingly no longer be a part of the corresponding object marking.

It is furthermore particularly advantageous if at least one further section of the same material piece or of a further material piece of the basic material is determined arbitrarily and/or randomly and the object marking is produced with the at least two sections. In this respect, it is not only the properties of the two separate sections, but also their relative arrangement which is preferably chosen randomly, which forms a part of the features used for the authentication of the object marking. In general, partial or complete overlapping of the sections may also occur, which is also absolutely desired.

In this connection a physical random of the arrangement may additionally be introduced in that the at least two sections are mixed with an at least temporarily liquid or paste-like carrier mass. In this process, not only the two-dimensional arrangement, but the three-dimensional arrangement of the sections is varied and determined randomly, such that the sections are arranged under different viewing angles and—in the case of optically variable features—may comprise a combination of optical features which is not even available in the basic material. Accordingly, during object marking, the section is favorably arranged along with at least one further variable, preferably random, section of a material piece of the basic material in an at least temporarily liquid or paste-like carrier mass.

If the carrier mass for producing the object marking is applied directly on the object, the marked object becomes an inseparable part of the object marking since it serves as a carrier for the carrier mass which is not inherently stable, such that a detachment of the carrier mass results in the destruction of the object marking. Accordingly, in an object with an appropriate object marking the carrier mass with the sections for forming the object marking may be applied directly on the object or form a constituent of the object.

Alternatively, a foil may also be produced from the carrier mass. Subsequently, the object marking is produced with this foil. The advantage of this is that objects which do not have sufficient inherent stability (e.g. elastic substances or the like) can also be marked without the object marking being destroyed by the expedient use of the object. Accordingly, the carrier mass may be processed with the sections as a foil for forming the object marking.

As a third possibility it has turned out to be of advantage if the at least one section is applied on a carrier material for producing the object marking. The carrier material may especially be a web or a sheet of a flat material, e.g. paper or a foil. Due to further stochastic processes in the production process, e.g. caused by minimally different advance speeds of the section and/or of the basic material, on the one hand, and the carrier material, on the other hand, in a series production, the position of the section may vary within the object marking individually and randomly, such that a positioning inaccuracy of the section within the object marking which is achieved in this way also corresponds to a "true" random and may be evaluated and thus contributes to the safety of the object marking. In particular in series production—and the associated accumulated effect e.g. of inaccuracies in advance speed synchronization—no series with identical object markings can thus be produced even with existing basic material and selection provision.

The described production variants, i.e. where the object marking comprises a carrier mass or a carrier material, have the advantage that, due to the additional stochastic physical processes in the course of the connection of the section with the carrier mass and/or the carrier material, individually deviating object markings are even achieved in the unlikely case that a section is twice taken with a particular selection mask at the same position of the security feature and is applied on the carrier material and/or incorporated in the carrier mass.

Furthermore, it is favorable if the same material piece and/or at least a further section of the material piece is used for the production of at least one further object marking. This means that only a selected part of the basic material is taken from the material piece for producing a first section, and the remaining material which does not belong to the section remains part of the material piece and may thus be further used. This multiple and/or repeated use of a material piece, i.e. one and the same material piece, for producing a plurality of separate object markings, in particular for different objects, makes it possible to efficiently use the quantity of required basic material, on the one hand, and, on the other hand, all sections which have already been taken influence the section assigned to the corresponding object marking, such that the reproducibility is further reduced. Moreover, in this case, sections which have been taken successively cannot or can hardly be referred to for reconstruction of the basic material since in this case naturally no overlapping of the sections are disclosed.

Moreover, further authentication features may be added to the object marking when the object marking is connected with the object, wherein the object marking is arranged variably and randomly with respect to the object and/or an orientation mark applied on the object. In particular, the section and/or the sections may be connected with an object in a variably determined arrangement or a random arrangement caused by production tolerances, such that the arrangement relative to the object and/or to an orientation mark provided on the object forms a part of the object marking. In this connection, an appropriate object marking may be connected with an object, wherein the object marking is arranged with respect to the object and/or an orientation mark applied on the object variably, in particular caused by production tolerances, randomly.

Moreover, it is particularly favorable in this connection if the properties generated by the random arrangement of the object marking are determinable and readable with a commercially available camera. In this case the respective properties may be taken into account with an electronic examination of the object marking.

The invention also relates in particular to the use of the described object marking in connection with a method and/or system for the distinct marking of an object, as described in the preceding PCT application with file number PCT/AT2013/050121, wherein unique features are digitized and signed with a private key, and the unique features themselves are arranged on the object or a package of the object in addition to the signature of the digitized features, or are formed by at least a part of the object or the package thereof, and the authenticity of the object is determined by a comparison of the unique features with the signature of the digitized features arranged on the object or the package thereof and decrypted with a public key. For providing a safe method which can be implemented easily and in a cost efficient manner, the unique features are formed by optically detectable three-dimensional structures or materials having optical properties differing as a function of the viewing angle, and the digitized features are generated with the aid of an algorithm which is applied to at least two digital pictures of the unique features which are taken with at least one digital camera.

BRIEF DESCRIPTION OF THE DRAWINGS

In the following, the invention will be explained further by means of particularly preferred embodiments to which it is not to be restricted, though, and with reference to the drawing. The drawing illustrates in detail in.

DETAILED DESCRIPTION OF THE INVENTION

Figure 1:
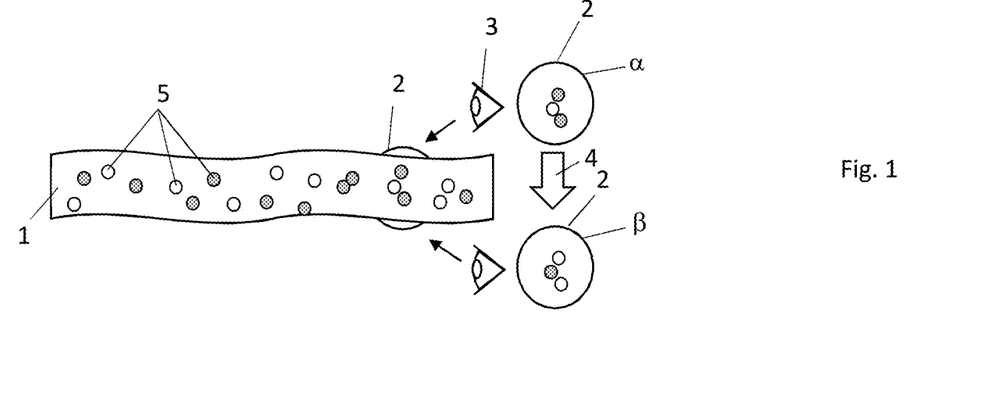
FIG. 1 schematically a material piece of a basic material having optical properties dependent on the viewing angle.

FIG. 1 illustrates a material piece 1 of a basic material, wherein a region 2 of the material piece is illustrated in accordance with its appearance under a first viewing angle α (indicated schematically by the eye 3 of the observer) and in accordance with its appearance under a second viewing angle β. The arrow 4 indicates schematically a change of the viewing angle between the illustrations α, β (cf. FIG. 2). For protection from two-dimensional copies, a plurality of security features 5 are arranged on the material piece 1, which each have different appearances and/or more generally different optical properties under different viewing angles α, β. The security features 5 may, for instance, correspond to machine-readable patterns or signals. A change 4 of the viewing angle on the material piece 1 thus causes, for instance, a change of the illustrated pattern and/or sign, its coloring and/or its visibility.

Figure 2:
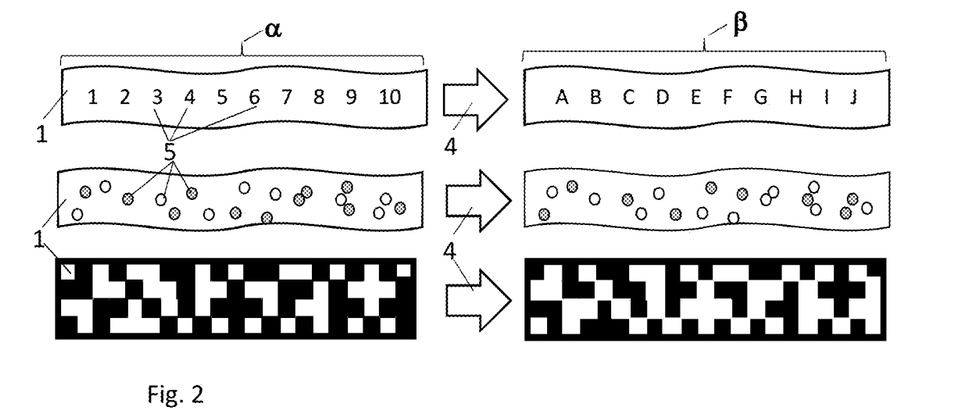
FIG. 2 schematically a number of examples of material pieces of different basic materials under different viewing angles.

In order to enable the evaluation with the aid of a commercially available programmable device, such as a smart phone, the optical properties, such as patterns and/or signs, must have certain properties. They must, for instance, have a minimum size of 100 μm×100 μm. Moreover, a sufficiently high contrast between the properties and their background is required for the computer-aided image processing. This may be expressed by differences in brightness, advantageously, however, in their coloring or other optical properties. The patterns used may comprise the most different characteristics, as is illustrated in FIG. 2. Thus, geometric figures are as suited as the illustration of different signs. Examples of such basic materials are materials with holograms, lenticular materials, saw tooth foils, or foils for restricting the viewing angle.

Figure 3:
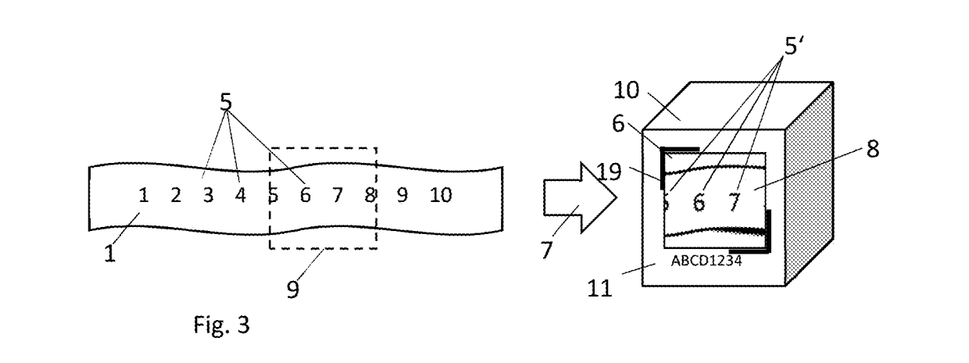
FIG. 3 schematically the selection of a section of a material piece pursuant to FIG. 2 for producing an object marking.

FIG. 3 illustrates the production of an object marking 6 by the application 7 of a section 8 in accordance with a selected region 9 of the material piece 1. The section 8 may be applied on an object 10 by different methods, such as cold or hot embossing technologies, wherein the object 10 may also be a carrier material belonging to the object marking 6. The method used for application 7 is predominantly dependent on the nature of the object 10 and/or the material piece 1, such as heat sensitivity or surface structure.

Increased protection from copying with the aid of identical production resources is achieved by the use of a random application 7. In this process, a region 9 of the material piece 1 is selected arbitrarily and the section 8 of the material piece 1 which corresponds to the region 9 is applied on the object 10. In the case of a cold or hot embossing method the selection of the region 9 and the application 7 are one process step. The material piece 1 is available in the form of a continuous foil of the basic material, wherein the embossing method does not register the positioning of the material piece 1, such that the region 9 is selected by an arbitrary material advance and the corresponding section 8 is applied on the object 10.

In order that the security features 5' applied on the object 10 can be referred to for authentication in combination with a unique series number 11, care is taken when selecting the basic material that the security features 5 contained thereon have sufficiently high variation and a period exceeding the dimensions of the region 9. Since such materials, for instance, holograms, regularly have periodically repeating patterns, a sufficiently arbitrary selection with a given period may be achieved by the choice of a suitable size of the region 9 and by a suitable material advance 12 (cf. FIG. 4).

Figure 4:
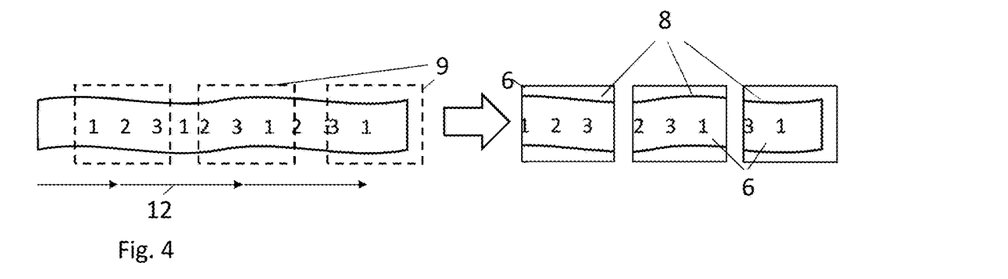
FIG. 4 schematically three sequentially selected sections of a material piece in accordance with a random advance.
Figure 5:
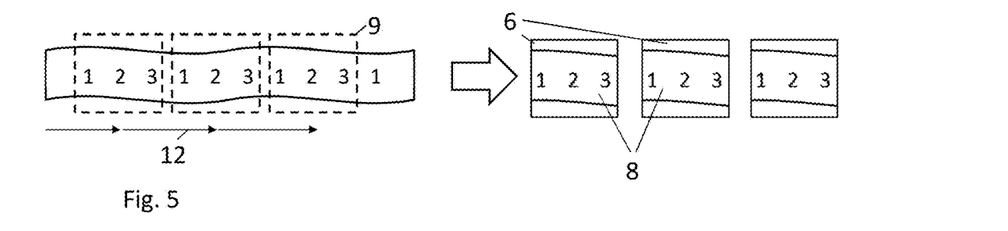
FIG. 5 for comparison schematically three sequentially selected sections of a material piece in accordance with a constant advance.

The actual variation, i.e.—broadly speaking—the number of sections to be produced until a pattern repeats, is calculated by the lowest common multiple of the period of the pattern of the basic material and the selected dimension of the material advance 12, 12', unless further measures are applied for varying the sections and/or the object markings. FIGS. 4 and 5 illustrate the possible effects of a favorable (FIG. 4) and/or unfavorable (FIG. 5) choice of these parameters. In FIG. 4 some advantageous regions 9 of the material piece 1 are indicated which are selected by a variable random material advance 12 and result in a variation of the resulting sections 8 and hence the object markings 6. In FIG. 5 the most unfavorable possible selection of regions 9 of the material piece 1 is illustrated, wherein the material advance 12' corresponds exactly to the period of the security features, such that always the same region is selected and thus always the same section 8 is used for the production of the object markings 6.

The security features 5 dependent on the viewing angle and the optical properties of the basic material may be completely different patterns or variations of a pattern and/or sign, for instance, by rotation or perspective projection of the same pattern. The use of rotation and projection yields advantages with the storing of the digital object properties since a smaller quantity of data is required due to better compressibility.

Figure 6:
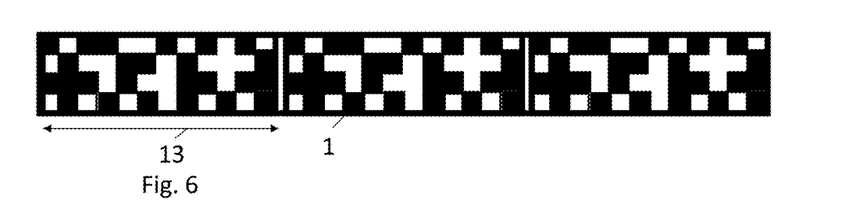
FIG. 6 schematically a period of a security feature of a material piece.

If the period of the (unchanged) security feature is relatively small and/or only slightly larger than the dimensions of the object marking to be produced, i.e. if the security feature (e.g. the pattern) on the material piece 1 repeats in short periodic intervals 13, as illustrated in FIG. 6, only little variation is achieved with the hitherto described methods. An increase in variation is achieved by the method for producing an object marking by a plurality of sections 14 of a material piece 1, illustrated schematically in FIG. 7. Here, from a region 9 selected in a first step 15, only the sections 14 corresponding to a selection mask 16 are applied on the object 10 in a second step 17. Since a static selection mask 16 does not result in an improvement of the variation, but merely in a smaller area of the same selection, the pattern of taking 18 of the selection mask 16 is always changed. Due to the variable selection masks 16, 16' a new combination of security features and hence different object markings 6 are applied on the objects 10 even with identical selection of the region 9. By the different selection masks 16 and 16' such a change is illustrated schematically and may be achieved with an embossing method, for instance, by the rotation of a stamp. The use of digital embossing methods is more advantageous, wherein, for instance, the embossing punch is changed dynamically or the adhesive is applied dynamically.

Figure 7:
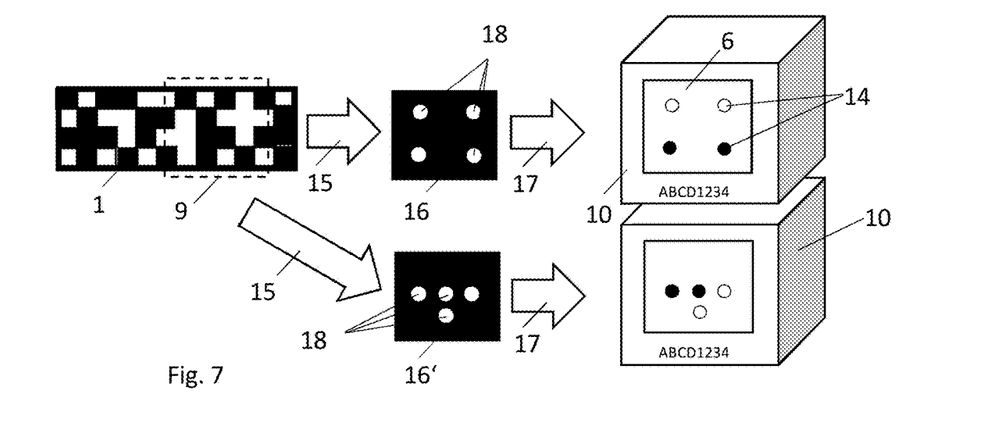
FIG. 7 schematically the application of different selection masks to one and the same selection of the material piece for producing different object markings.

An alternative or additional approach for the dynamic selection of a plurality of sections 8 of a material piece 1 without separating it is a partial covering by a further material. Here, a material section corresponding to the entire selected region 9 is applied on the object 10 and overlapped by a covering material having the form of a selection mask 16. The covering material may, for instance, be a color layer which is applied by a digital printing method. Overlapping may be performed before or after the selection of the material section.

Figure 8:
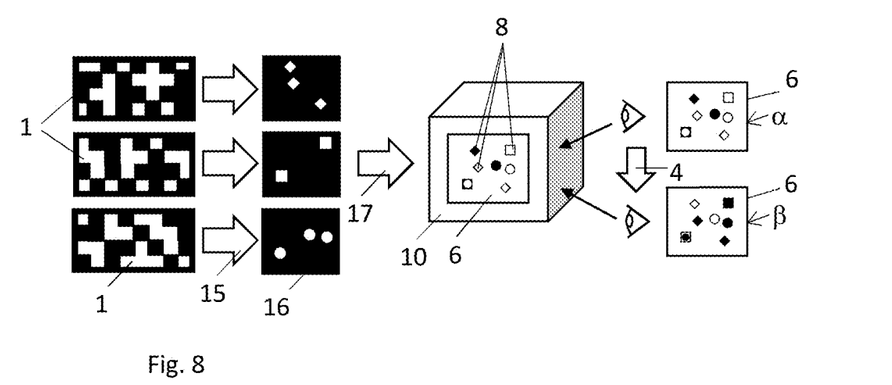
FIG. 8 schematically the combination of the sections of three material pieces defined in accordance with different selection masks to form an object marking.

A further increase in variations and in the end also in security is possible by the method for producing an object marking 6 by a plurality of sections 8 of a plurality of independent material pieces 1, as illustrated in FIG. 8. Due to the use of different basic materials and/or materials with different security features the achieved variation of the resulting object marking is many times higher and a copy is thus more difficult to obtain. The security features corresponding to the sections 8 and hence the object marking 6 have an optical appearance which differs with a change 4 of the viewing angle α, β.

The variation of the security features may moreover be increased by a repeated use of a, i.e. one and the same, material piece 1. Thus, for instance, a material piece 1 which has already been used comprises gaps having an influence on the resulting sections 8 during further use.

Furthermore, an increase in the variations is moreover possible by the removal of arbitrary sections prior to the selection of a region 9 and/or the application 7, 17 of the selected section 8 of the material piece 1. Thus, it is, for instance, possible to punch arbitrary patterns out of a foil before it is applied.

Moreover, a further property usable for authentication may be introduced by a variation of the position of the object marking 6 relative to the object 10 itself or an orientation mark 19 applied on the object 10 (cf. FIG. 3).

Figure 9:
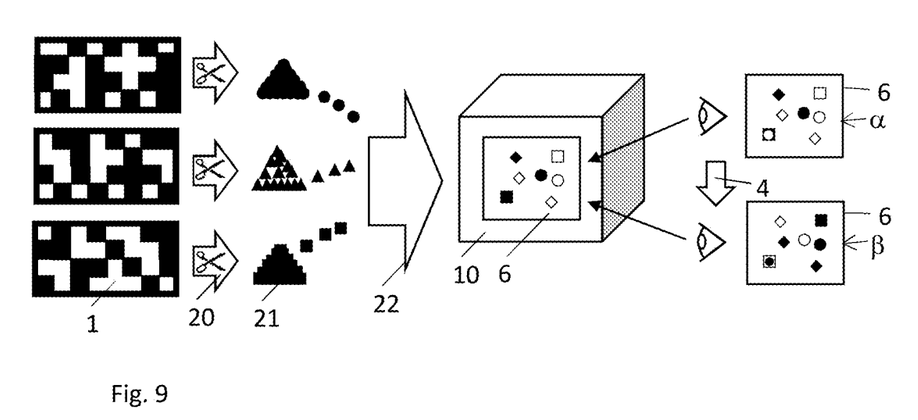
FIG. 9 schematically a fragmentation of a plurality of material pieces and the combination of sections in the form of pieces of each material piece to form an object marking.

The indirect application illustrated schematically in FIG. 9 is an alternative method for producing an object marking in the scope of the invention. Here, in a first step 20 at least one material piece 1 having optical properties dependent on the viewing angle and/or security features is divided into small parts and/or sections 21 which are applied arbitrarily on the object 10 in a second step. This may, for instance, be implemented by the chaffing of a hologram foil, the mixing of the resulting small parts 21 with a fluid or paste-like carrier mass, such as a varnish, and the application of the carrier mass along with the small parts 21 with the aid of a printing method. In order to enable the readability of the object marking produced this way with the aid of a commercially available programmable device with a camera, it has turned out favorable if the resulting small parts 21 have a minimum diameter of 100 μm. Examples of suitable basic materials having properties dependent on the viewing angle are: holograms, lenticular materials, saw tooth foils, or foils for restricting the viewing angle.

A variant of the method for producing an object marking by means of indirect application in accordance with the invention is the incorporation of the material parts and/or sections 21 of at least one material piece 1 in a foil (not illustrated), from which foil subsequently at least one arbitrary region is selected and a corresponding section of the foil is applied on the object 10.

If an application of the parts and/or sections 21 by embedding in a further material, i.e. a carrier material, with sufficient material strength is chosen, it is in particular possible to also use materials which themselves do not have any properties dependent on the viewing angle. This is based on the fact that the parts 21, with sufficient material strength of the embedding and/or surrounding material, may have different orientations, i.e. orientations which are generally not parallel to the object surface, so that properties dependent on the viewing angle result for the entirety of the arrangement. An example thereof are parts 21 of a reflecting material which are fragmented, e.g. chaffed, and incorporated in a foil. Depending on the viewing angle the foil such produced thus has different reflecting properties.

What is claimed is:

1. A method for producing an object marking for optical authentication of an object comprising:
   randomly determining at least one section of a material piece of a basic material, the section having dimensions;
   producing an object marking comprising the at least one section;
   wherein the basic material of the material piece has a repeating security feature having optical properties dependent on the viewing angle;
   wherein the security feature has larger dimensions than the section dimensions such that each section is unique and comprises only a part of the security feature; and
   wherein at least one randomly determined part of the material piece is removed prior to the production of the object marking.

2. The method of claim 1, wherein the security feature has larger dimensions than the object marking.

3. The method of claim 1, wherein the security feature of the basic material is an optically variable feature.

4. The method of claim 3, wherein the security feature of the basic material is a hologram.

5. The method of claim 1, wherein the security feature and/or its optical properties have dimensions which correspond at least to a resolving power of a human eye.

6. The method of claim 5, wherein the security feature and/or its optical properties have dimensions that correspond to a resolving power of a commercially available camera, such that the security feature is readable and verifiable with a commercially available camera.

7. The method of claim 1, wherein the material piece is designed in the form of a band, and a position of the band is selected by a random or non-controlled advance of the band and the section is determined in relation to the selected position.

8. The method of claim 7, wherein the advance of the band deviates from the period of the security feature of the basic material.

9. The method of claim 1, wherein the section is determined by a variable, random selection mask, wherein the section is determined either in correspondence with a region of the material piece masked by the selection mask or in correspondence with a region of the material piece unmasked or spared by the selection mask.

10. The method of claim 9, wherein the variable selection mask is applied on the material piece in the form of a partial cover.

11. The method of claim 10, wherein the variable selection mask is applied on the material piece in the form of a layer applied in places or in regions.

12. The method of claim 1, wherein the at least one randomly determined part of the material piece is removed prior to the determining of the section.

13. The method of claim 1, wherein at least one further section of the same material piece or of a further material piece of the basic material is determined arbitrarily or randomly and the object marking is produced with the at least two sections.

14. The method of claim 13, wherein the at least two sections are mixed with an at least temporarily liquid or paste-like carrier mass which is applied on the object directly or indirectly.

15. The method of claim 1, wherein the at least one section is applied on a carrier material for producing the object marking.

16. The method of claim 1, wherein the object marking is connected with the object, wherein the object marking is arranged variably and randomly with respect to the object or an orientation mark applied on the object.

17. The method of claim 16, wherein the properties generated by the random arrangement of the object marking are determinable and readable with a commercially available camera.

18. A method for producing an object marking for optical authentication of an object comprising:
randomly determining at least one section of a material piece of a basic material, the section having dimensions;
producing an object marking comprising the at least one section;
wherein the basic material of the material piece has a repeating security feature having optical properties dependent on the viewing angle;
wherein the security feature has larger dimensions than the section dimensions such that each section is unique and comprises only a part of the security feature; and
wherein at least one further section of the same material piece or of a further material piece of the basic material is determined arbitrarily or randomly and the object marking is produced with the at least two sections.

19. The method of claim 18, wherein the security feature of the basic material is an optically variable feature.

20. The method of claim 18, wherein the at least one section is applied on a carrier material for producing the object marking.

* * * * *